US012798909B2

(12) United States Patent
Hayes

(10) Patent No.: US 12,798,909 B2
(45) **Date of Patent: *Nov. 17, 2026**

(54) SPREADER DEVICE AND METHOD OF USING THE SAME FOR OPTIMIZING THE DISTRIBUTION OF GRAIN IN STORAGE CONTAINERS

(71) Applicant: Patrick Hayes, Welsh, LA (US)

(72) Inventor: Patrick Hayes, Welsh, LA (US)

(*) Notice: Subject to any disclaimer, the term of this patent is extended or adjusted under 35 U.S.C. 154(b) by 80 days.

This patent is subject to a terminal disclaimer.

(21) Appl. No.: 19/048,101

(22) Filed: Feb. 7, 2025

(65) Prior Publication Data

US 2025/0382144 A1 Dec. 18, 2025

Related U.S. Application Data

(63) Continuation of application No. 18/744,202, filed on Jun. 14, 2024, now Pat. No. 12,252,359.

(51) Int. Cl.
*B65G 69/04* (2006.01)

(52) U.S. Cl.
CPC ................................ *B65G 69/0458* (2013.01)

(58) Field of Classification Search
CPC ........................ B65G 69/0458; B65G 69/0441
See application file for complete search history.

(56) References Cited

U.S. PATENT DOCUMENTS

| | | | | | |
|---|---|---|---|---|---|
| 3,045,840 | A * | 7/1962 | Donelson, Jr. ..... | B65G 69/0458 | 198/642 |
| 4,040,529 | A * | 8/1977 | Wurdeman ........ | B65G 69/0441 | 193/17 |
| 4,164,327 | A * | 8/1979 | Clark ..................... | B65G 31/04 | 239/669 |
| 4,216,914 | A * | 8/1980 | O'Hanlon .......... | B65G 69/0458 | 406/162 |
| 4,342,532 | A * | 8/1982 | Voegele ............. | B65G 69/0441 | 193/2 R |
| 4,437,613 | A * | 3/1984 | Olson ................... | A01F 25/186 | 239/110 |
| 4,611,965 | A * | 9/1986 | Dixon ................ | B65G 69/0441 | 239/689 |
| 4,902,185 | A * | 2/1990 | Dixon ................ | B65G 69/0441 | 239/651 |
| 5,020,701 | A * | 6/1991 | Donelson ........... | B65G 69/0458 | 222/504 |
| 5,324,159 | A * | 6/1994 | Nowobilski ............. | B01J 8/002 | 414/301 |
| 5,372,467 | A * | 12/1994 | Harris ................ | B65G 69/0458 | 239/681 |

(Continued)

*Primary Examiner* — Joseph A Dillon, Jr.
(74) *Attorney, Agent, or Firm* — Kean Miller LLP; Stephen M. Kepper

(57) ABSTRACT

The present invention is a spreader device used to fill a container or silo with grain that comprises a shaped body including a primary opening with a removable cover and several angled, peripheral openings located a distance from the primary opening. The spreader functions by allowing grain to pass through its primary opening to form a single flow column and grain pile and then having the primary opening closed via the cover to direct grain to the one or more peripheral openings, thereby creating multiple flow columns and grain piles that are located radially away from the primary flow column and grain pile.

9 Claims, 6 Drawing Sheets

(56) References Cited

U.S. PATENT DOCUMENTS

| | | | | | |
|---|---|---|---|---|---|
| 5,403,141 | A * | 4/1995 | Rauser | B65G 69/0458 414/301 |
| 5,941,464 | A * | 8/1999 | Seymour | A01C 3/063 239/675 |
| 5,957,394 | A * | 9/1999 | Becker | A01K 5/002 239/689 |
| 6,123,276 | A * | 9/2000 | Ungerer | A01C 19/00 239/675 |
| 6,311,744 | B1 * | 11/2001 | Cary | B67D 7/3236 137/561 A |
| 6,471,029 | B1 * | 10/2002 | Pierce | B65G 69/0441 193/29 |
| 6,866,075 | B2 * | 3/2005 | Whitley | B65G 69/0458 141/34 |
| 6,991,415 | B1 * | 1/2006 | Anschultz | B65G 69/0441 414/299 |
| 7,931,432 | B2 * | 4/2011 | Hershberger | B65G 69/0458 414/301 |
| 7,946,796 | B2 * | 5/2011 | Halland | B65G 69/0441 414/303 |
| 8,708,632 | B2 * | 4/2014 | Toline | A01F 25/186 414/300 |
| 9,271,441 | B2 * | 3/2016 | Truan | A01C 17/003 |
| 9,458,585 | B2 * | 10/2016 | Phelps | E01H 10/007 |
| 10,271,477 | B2 * | 4/2019 | Ricketts | A01D 41/1243 |
| 10,398,081 | B2 * | 9/2019 | Isaac | A01D 41/1243 |
| 10,894,677 | B2 * | 1/2021 | Honeck | B65G 69/0441 |
| 11,001,459 | B2 * | 5/2021 | Girard | B01J 8/002 |
| D931,340 | S * | 9/2021 | Alig | D15/28 |
| 11,330,765 | B2 * | 5/2022 | Kibbe | B65G 69/0441 |
| 11,472,646 | B2 * | 10/2022 | Kibbe | A01F 25/186 |
| 11,547,048 | B2 * | 1/2023 | De Baere | A01D 41/1243 |
| 11,577,922 | B2 * | 2/2023 | Honeck | B65G 65/32 |
| 11,649,122 | B2 * | 5/2023 | Martin | B65G 69/0458 414/299 |
| 11,697,561 | B2 * | 7/2023 | Agnew | A01F 25/163 193/17 |
| 11,851,296 | B2 * | 12/2023 | Alig | B65G 69/0441 |
| 11,878,880 | B2 * | 1/2024 | Alig | B65G 69/0441 |
| 12,441,563 | B2 * | 10/2025 | Honeck | B65G 69/0441 |
| 2014/0162739 | A1 * | 6/2014 | Isaac | A01D 41/1243 460/111 |
| 2017/0107680 | A1 * | 4/2017 | Gamble, II | B65G 31/04 |
| 2020/0128755 | A1 * | 4/2020 | Kibbe | B65G 69/0441 |
| 2020/0130965 | A1 * | 4/2020 | Kibbe | A01F 25/186 |
| 2020/0296884 | A1 * | 9/2020 | Lauze | A01C 15/12 |
| 2021/0403257 | A1 * | 12/2021 | Alig | B65G 69/0441 |
| 2024/0343509 | A1 * | 10/2024 | Honeck | B65G 69/0441 |

* cited by examiner

SPREADER DEVICE AND METHOD OF USING THE SAME FOR OPTIMIZING THE DISTRIBUTION OF GRAIN IN STORAGE CONTAINERS

RELATED APPLICATIONS

This application is a continuation of U.S. application Ser. No. 18/744,202, filed Jun. 14, 2024, and the entire contents of the above application are hereby incorporated by reference as though fully set forth herein.

FIELD OF THE INVENTION

The present invention relates generally to a device and method for optimizing the process of filling silos and other containers with grain, and in particular rice grain.

GENERAL BACKGROUND

The early history of rice drying incorporated a rudimentary technique of allowing grain to naturally flow into smaller grain drying silos. Rice silos ranged between 18 and 30 feet in diameter. Once the silos were filled, they were leveled by hand to insure even drying throughout the grain. As the rice grain drying industry became more efficient, the size of the silos increased dramatically. Today, rice drying silos are now between 36 to 60 feet in diameter, which makes hand leveling very difficult and not commercially viable. Instead, devices commonly known as spreaders are utilized to disperse the grain evenly within the silos. Currently, the only spreaders on the market are specifically tailored for other types of grain, namely, corn.

There are two types of spreaders known in the art today. The first is an electrically powered spreader that is rotated circumferentially and is configured to throw the grain around the tank. The other spreader uses gravity to sprinkle grain into multiple different piles. While these techniques work for most commodities, they are not well-suited for rice grain. Unlike other grains, spreading rice using either of these two devices causes the rice grains to interlock (called "rice packing"). Rice is dried using fans and heaters that blow warm, dry air from the bottom of the stack of grain through the top. When rice packing occurs, warm, dry air is prevented from flowing properly and uneven drying conditions occur. Likewise, a spreading device that diverts rice into multiple different piles for the entire fill process leads to the buildup of debris around the perimeter of each smaller pile, and this buildup obstructs further proper air flow during the air drying process.

When the rice grains are dried unevenly, the quality of the end-product is negatively impacted. Rice is normally harvested at a 20% moisture content and dried in silos down to 12% moisture content. If rice is over-dried, it will crack, which will lower the market value. If rice is under-dried, and the moisture percentage does not get down to the required 12% moisture content, buyers will refuse it.

Accordingly, there is a need for a device that facilitates the distribution of rice in a silo that allows for proper air flow and drying.

SUMMARY OF THE INVENTION

It is an object of this invention to solve the problems in the art by providing a spreader device that can easily be incorporated into existing rice grain silos and allow for proper distribution of grain for drying and storing. The spreader device comprises a base defining a horizontal plane with the base having a primary opening and a barrier wall extending from the base at an angle from the horizontal plane. The device further comprises a cover operable to open and close the primary opening and at least one or more peripheral openings disposed around the barrier wall.

The spreader functions by allowing grain to first pass through its primary opening and form a single flow column and pile of grain in the silo. The primary opening is then closed via the cover and grain is dispersed throughout the silo through the one or more peripheral openings, thereby creating multiple flow columns and grain piles that are located radially away from the primary flow column and grain pile. Optionally, chutes may be attached at the peripheral openings to aid in dispersing the grain to different locations within the silo.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
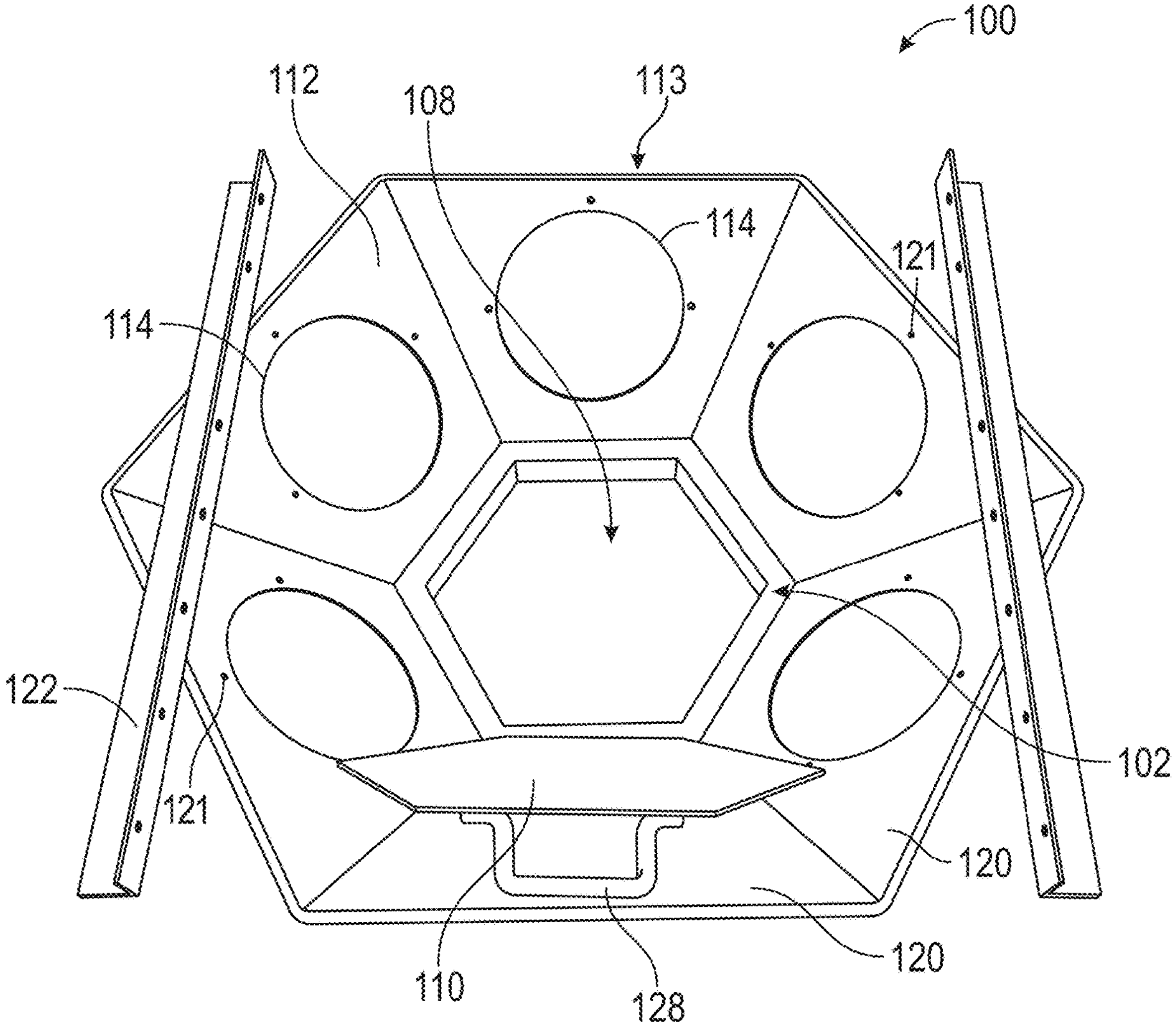
FIG. 1 depicts a top-down view of the spreader device having the cover in an open configuration in accordance with embodiments of the invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the Figures, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the device and method of the disclosure, as represented in the Figures is not intended to limit the scope of the disclosure, as claimed, but is merely representative of possible embodiments of the disclosure.

The following description sets forth numerous embodiments and parameters. It should be recognized, however, that such description is not intended as a limitation on the scope of the present invention but is instead provided as a description of exemplary embodiments. Various modifications to the examples described will be readily apparent to those of ordinary skill in the art, and the general principles defined may be applied to other examples and applications without departing from the spirit and scope of the invention. Thus, the present invention is not intended to be limited to the examples described herein but is to be accorded a scope consistent with the claims.

The present spreader device addresses a major problem associated with current grain and rice spreaders, namely, over-packing of the grain that leads to improper drying. As described below, the present spreader device is configured to be placed at the opening of a grain container or silo such that the grain entering the container or silo necessarily passes through the grain spreader device. In an alternative embodiment, the spreader device is configured such that it can be mounted to the ceiling of a silo from the interior of the silo.

Figure 2:
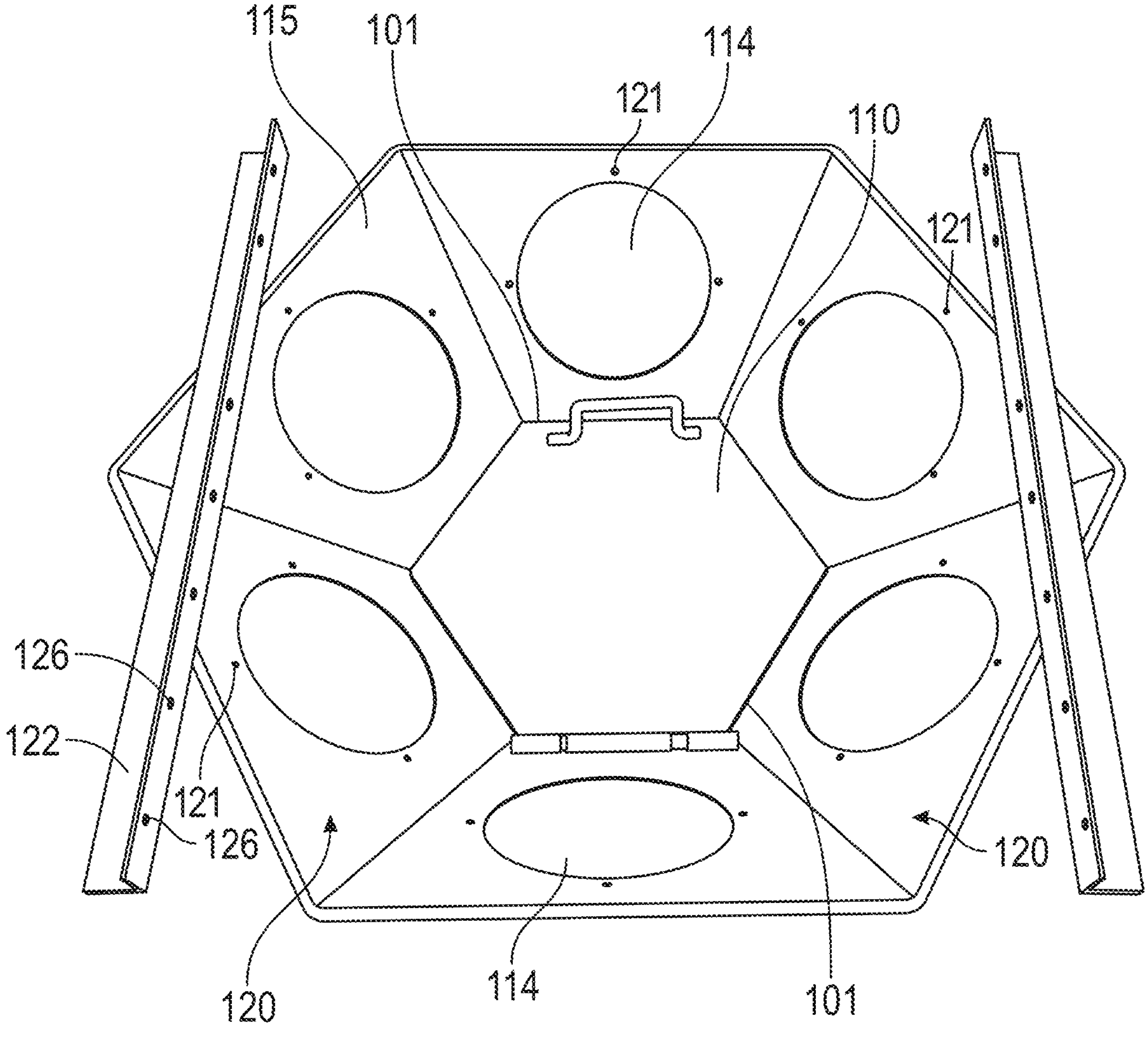
FIG. 2 depicts a top-down view of the spreader device having the cover in a closed configuration in accordance with embodiments of the invention.
Figure 3:
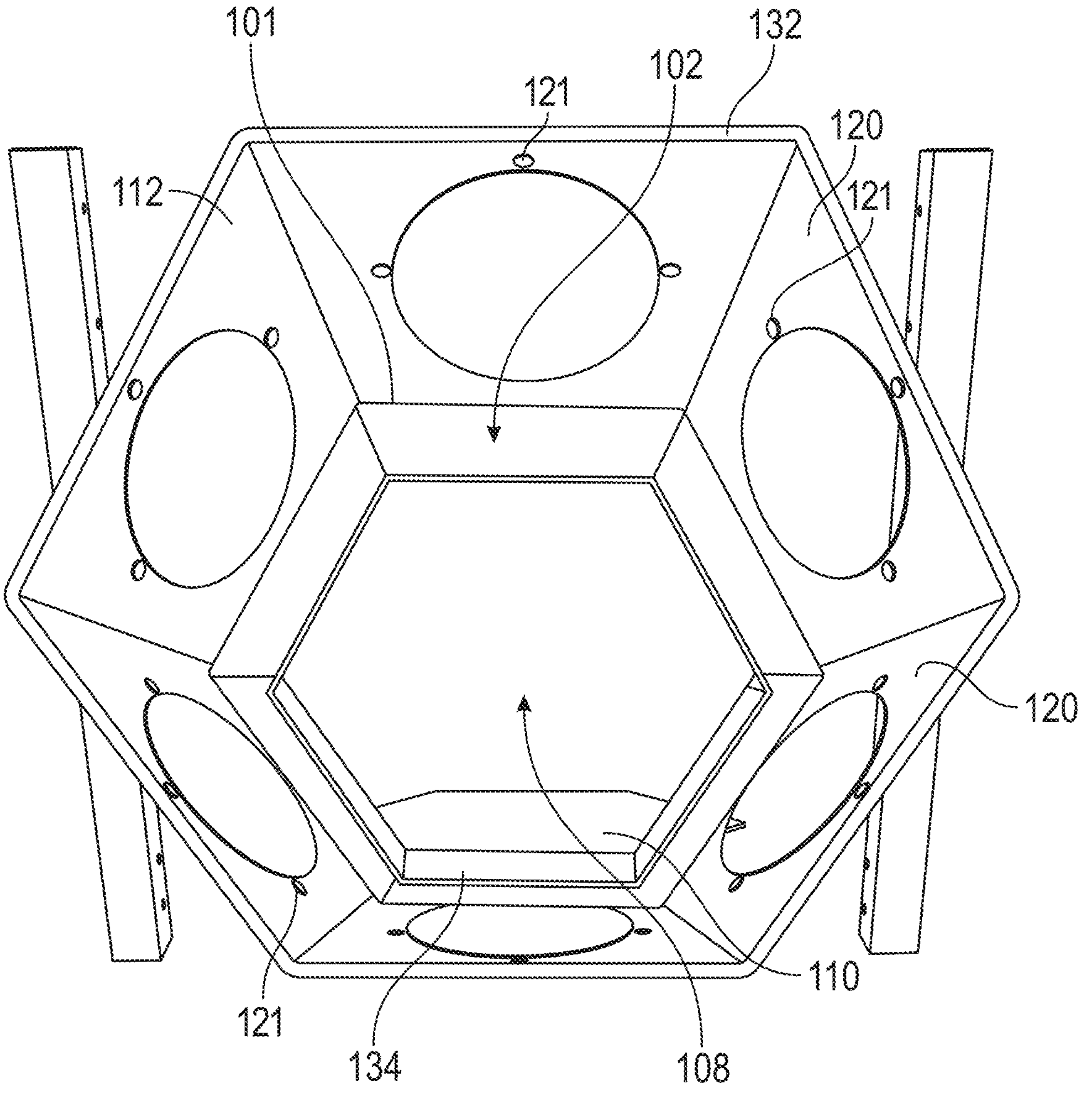
FIG. 3 depicts a bottom view of the spreader device having the cover in an open configuration in accordance with embodiments of the invention.
Figure 4:
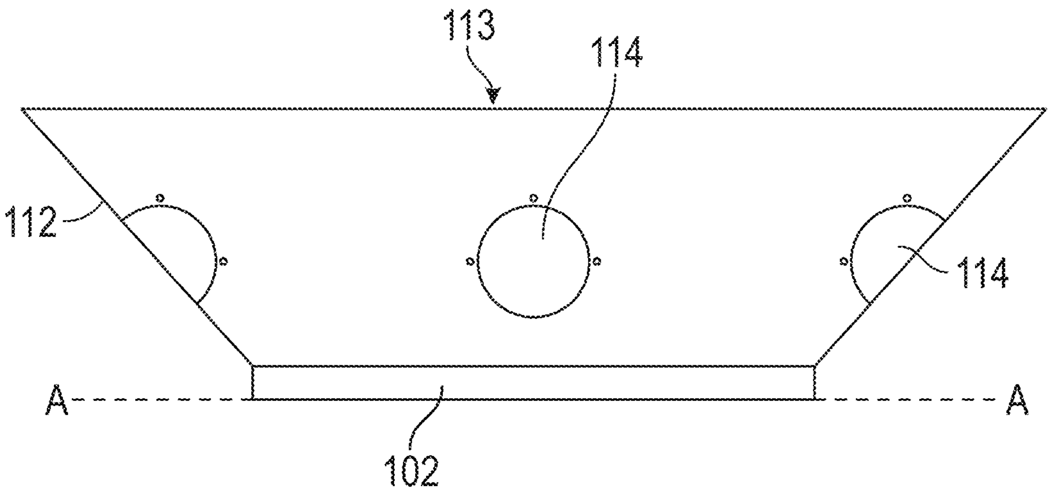
FIG. 4 depicts a front view of the spreader device in accordance with embodiments of the invention showing the horizontal plane A-A defined by the base.

Turning to FIGS. 1-5, the spreader device 100 comprises a base 102. The base 102 defines a horizontal plane A-A (as shown in FIG. 4) and includes a primary opening 108. In some embodiments, the primary opening 108 comprise a majority of the surface area of base 100. In other embodiments, the primary opening 108 does not comprise a majority of the surface area of base 100. The primary opening 108 is preferably positioned at a central location along the horizontal plane A-A within the base 100. As shown in FIGS. 3-4, the primary opening 108 may further comprise a collar 134 along the interior perimeter of the primary opening 108. The collar 134 may extend a distance below the primary opening 108 to help direct grain flow downward into the silo or container.

As shown in FIGS. 1-3, the preferred embodiment of the spreader device 100 includes a barrier wall 112 that extend upward from the perimeter 101 of the base 102 at an angle in relation to the horizontal plan A-A defined by the base 102. In some embodiments, the base 102 and barrier wall 112 form a generally conical shape to funnel grain into a cavity 113 formed within the barrier wall 112 and through the primary opening 108. As shown in the Figures, the barrier wall 112 may include a number of connected, substantially flat wall panels 120 that extend from base 102 at an angle. For purposes of this invention, alternative embodiments, including a barrier wall that is substantially curvilinear (as opposed to flat panels 120) is also envisioned. In a preferred embodiment shown in the Figures, the barrier wall 112 includes six substantially flat wall panels 120.

The spreader device 100 further comprises one or more peripheral openings 114 located a distance from the primary opening 108. Peripheral openings 114 may be located in the barrier wall 112. In the preferred embodiment, each wall panel 120 includes a single a peripheral opening 114. Peripheral openings may be any shape or size suitable to allow grain to easily pass through the opening. In a preferred embodiment, the peripheral openings are substantially circular and between 5 and 12 inches in diameter. Each peripheral opening 114 may define a plane that is angularly offset from the horizontal plane A-A defined by base 102. Optionally, each wall panel 120 comprises more than one peripheral opening 114.

As shown in FIGS. 1-3, the spreader device 100 includes a cover 110 coupled to the base 102 that is configured to open and close the primary opening 108. In a preferred embodiment, the cover 110 may be a hinged door that is connected to the base 102 such that the cover 110 opens into upward into the cavity 113 (as shown in FIG. 1). Alternatively, the cover 100 may open in a downward direction towards the bottom of the silo. The hinged door cover 100 may be manually opened and close via a handle 128 attached to the cover 110. The closure of primary opening 108 prevents grain from flowing through primary opening 108, thereby redirecting grain flow to the one more peripheral openings 114. Likewise, the peripheral openings may each have a removable covering to prevent unnecessary grain from penetrating through the peripheral openings 114 while the primary opening 108 is open. In alternative embodiments, the cover 110 is automated and controlled by an external controller (not shown). While the preferred embodiment comprises a hinged door, other covers 110 may be utilized, including but not limited to a one-part or two-part sliding door that opens and closes along the horizontal plane A-A. Alternatively, the cover 110 may also include a slot-slide cover or a non-attached cover piece.

Figure 5:
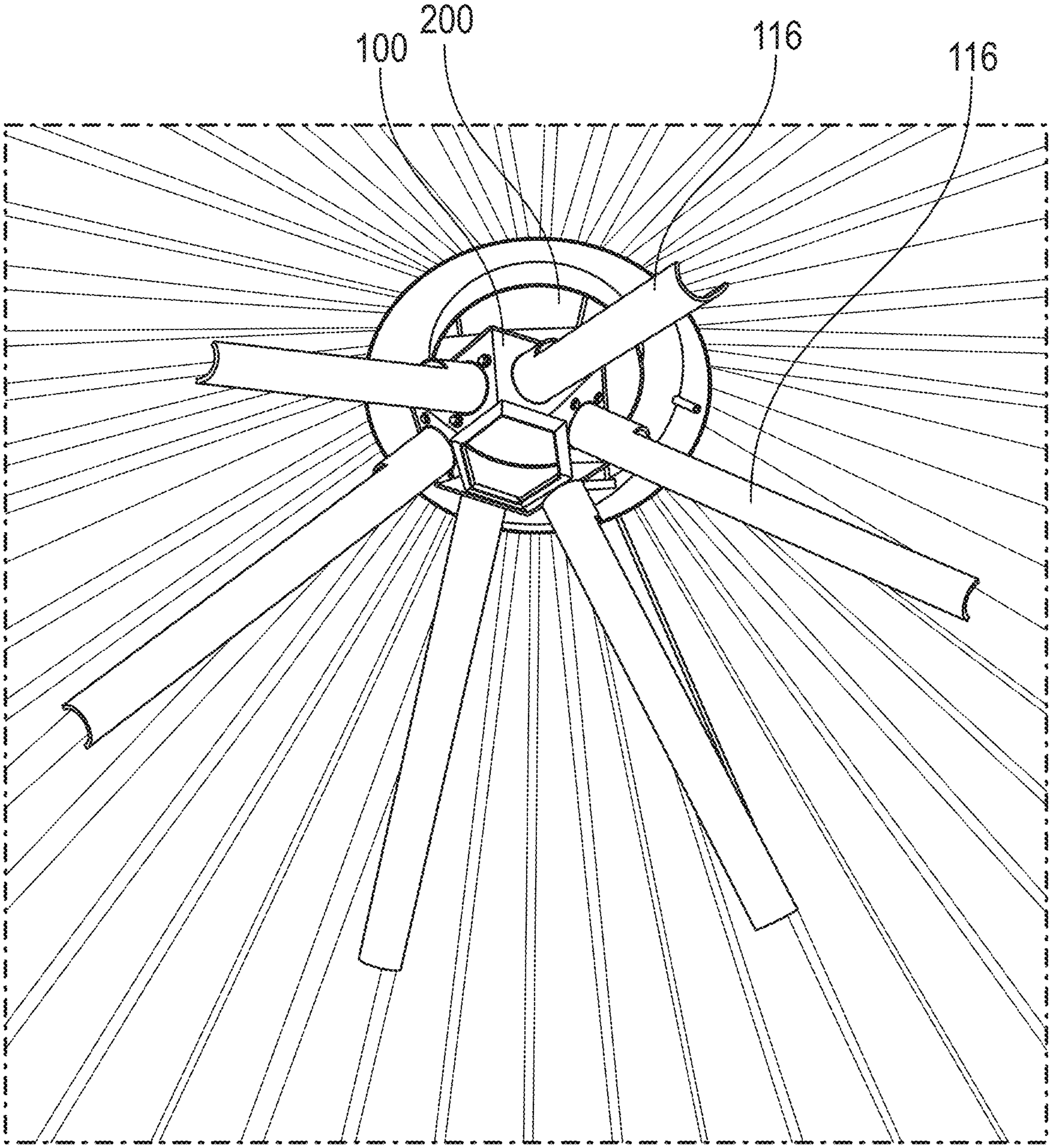
FIG. 5 depicts a spreader device with chutes being installed from the inside of the silo.
Figure 6:
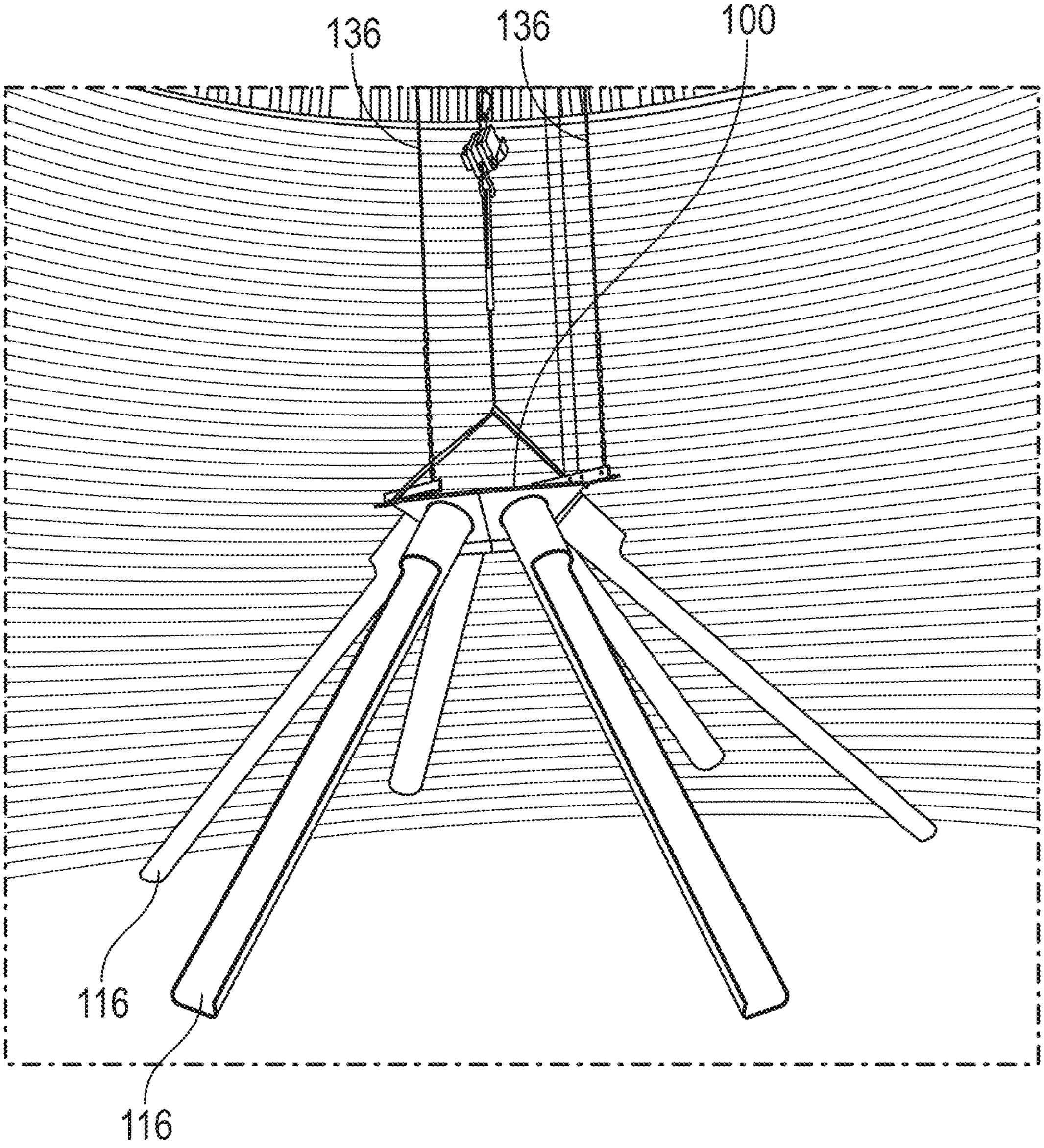
FIG. 6 depicts a side view of a spreader device being installed from the inside of the silo.

Turning to FIGS. 5-6, to further aid in the distribution of grain to the perimeter of the silo or container, one or more chutes 116 may be coupled to the barrier wall 112 at each of the peripheral openings 114. The opening of the one or more chutes 116 meet with the external side of barrier wall 112 such that when grain flows through the peripheral opening 114, the grain flows through chutes 116. In a preferred embodiment, the chutes 116 are removably attachable to the exterior of the wall panels 120. The chutes 116 may be removable attachable to the exterior of barrier wall 112 by interlocking components, e.g. nuts/bolts or fasteners known in the art. As shown in the figures, these fasteners can utilize one or more apertures 121. In some embodiments, the chutes 116 are permanently attached to the exterior of barrier wall 112. In some embodiments, each wall panel 120 of barrier wall 112 comprises a chute 116 attached to its exterior surface 115. In some embodiments, chutes 116 extend from the barrier wall 112 at an angle of 30-50° from the horizontal plane A-A defined by base 102. Chutes make take on a variety of shapes and sizes so long as the chutes 116 are operable to funnel grain to a desired location along a perimeter of the silo or container. Chutes 116 may be in a full-pipe or half-pipe configuration, or a mix of both as shown in the Figures. Alternatively, the chutes 116 may consists of a plurality of nested portions that allow for the length of the chutes 116 to be adjustable.

In some embodiments, spreader device 100 may include a mounting component 122 operable to mount the spreader device to the top ceiling of a silo or container. For example, as detailed in FIG. 1, the mounting component 122 may comprise one or more L-beams welded or coupled to the top of device 100. The L-beams include mounting apertures 126 configured to receive a fastener (e.g. nuts/bolts) operable to fasten the L-beam to the ceiling of the silo. In the preferred embodiment, the spreader device 100 is operable to be installed from the interior of the container using chains 136 (as shown in FIG. 6).

In alternative embodiments, the spreader device 100 may include a means of rotating the spreader device 100 circumferentially about a vertical axis that is orthogonal to the horizontal plan A-A by using, for example, a motor (not shown). The motor may be remotely controlled by an external controller that is operable to actuate the motor as well as control the speed at which the device 100 will rotate. The spreader device and rotating means are configured to have the spreader device 100 rotate in place while connected to the silo opening. The ability to rotate allows the grain, such as rice, to be spread around the silo when the primary opening 108 is closed and the grain flow is directed to the peripheral openings 114 of the spreader device. Means of rotating the spreader include, but are not limited to, a manual rotation by cable and pulley system, a wheel connected directly to the spreader or connected by one or more gears, an electric, hydraulic or combustion motor, a turbine, or any other means known in the art.

The spreader device 100, as described herein, may be used in a method to fill a silo or other grain container with grain, especially rice, in a way that reduces the accumulation of chaff and debris, prevents blockages of air flow in the drying phase of the storage process and promotes optimal air flow for the drying process. The first step in the method includes placing the spreader device 100 at a location such that the grain must pass through the spreader device 100 before entering the container. The location of the spreader device 100 may be just inside the opening 200 of the silo or container.

The method then requires the primary opening 108 in the base 102 of the spreader device 100 to be opened such that the grain passes primarily through the primary opening 108 and into the silo or container. This allows the silo or container to fill via a single flow column and creates a single grain pile in the silo. A single grain pile is desirable because chaff and debris naturally accumulate along the perimeter of a grain pile. This means a single pile pushes the blockage-creating chaff and debris to the outside of the silo or container where it will not create airflow obstructions at later stages. If a silo is filled in several piles, then chaff and debris are dispersed throughout the silo or container. The container or silo is allowed to fill via a single flow column until the silo or container is at least 50% full. In a preferred embodiment, the container or silo is allowed to fill via a single flow column until the silo or container is 50-80% full.

The method then requires closing the primary opening 108 and allowing grain to pass through at least one peripheral opening 114 in the barrier wall and into the silo or container such that grain is proportionately distributed a distance away from the center of the container or silo until the grain is filled substantially to the same level as the top of the crest of the single grain pile formed from the grain pouring through the primary opening 108. In some embodiments, the silo or container is filled via the peripheral openings of the spreader until the silo or container is full or to an alternative desired level.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical." Numerous modifications and adaptations will be readily apparent to those skilled in this art without departing from the spirit and scope of the present invention.

What is claimed is:

1. A spreader device comprising:

a base defining a horizontal plane, the base comprising a primary opening configured to receive a quantity of grain, a cover attached to the base and operable to close the primary opening and prevent grain from exiting the primary opening, and a barrier wall extending from the base at an angle from the horizontal plane to form an open cavity above the base, wherein the barrier wall comprises one or more peripheral openings.

2. The device of claim 1, wherein the spreader device further comprises a chute extending from each of the one or more peripheral openings.

3. The device of claim 2, wherein the chute is removably attachable to the barrier wall.

4. The device of claim 1, wherein the cover is hingedly connected to the base such that the cover opens into the cavity.

5. The device of claim 1, wherein the barrier wall comprises a plurality of substantially flat sections, wherein one of the one or more peripheral openings are disposed at each of the flat sections.

6. The device of claim 5, wherein the base is concentric, and wherein the plurality of substantially flat sections are distributed around the base.

7. The device of claim 1, wherein the spreader device further comprises a mounting component at a top of the barrier wall, wherein the mounting component is operable to mount the spreader device to a silo.

8. A method of filling a container with grain comprising the steps of:

providing a spreader device comprising a primary opening and at least one peripheral opening located a distance away from the primary opening, wherein the peripheral openings are configured to disperse the grain along a perimeter of the container;

placing the spreader device at a location such that the grain must pass through the spreader to enter the container;

opening the primary opening of the spreader device;

allowing the grain to pass through the primary opening until the container is filled with the grain up to a threshold level defined by a crest of the grain formed at or near the concentric center of the container; and closing the primary opening to prevent the grain from exiting the primary opening and allowing grain to pass through the at least one peripheral opening such that the grain is distributed a distance radially away from the concentric center of the container.

9. The method of claim 8, wherein the spreader device comprises a chute coupled to the peripheral opening.

* * * * *